(No Model.)
A. J. RUSSELL.
SLIDING AND SWINGING GATE.
No. 562,035. Patented June 16, 1896.
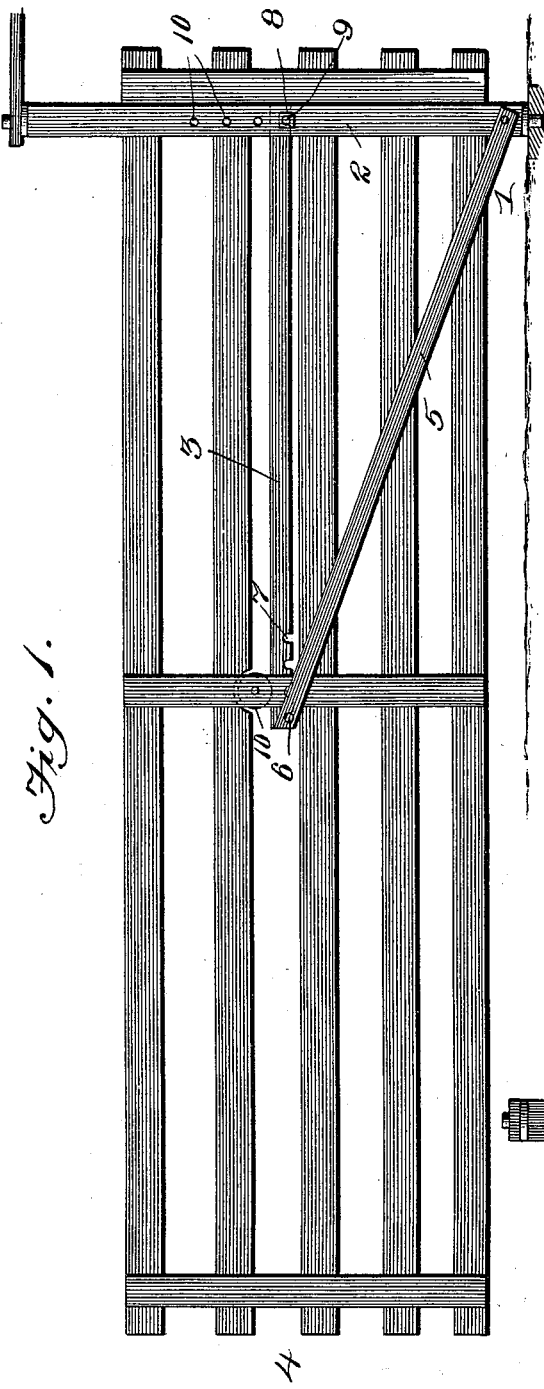
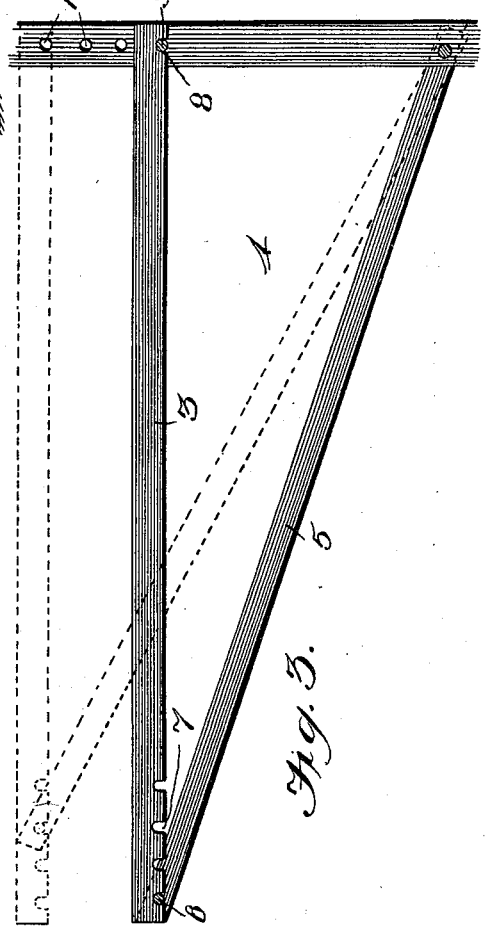
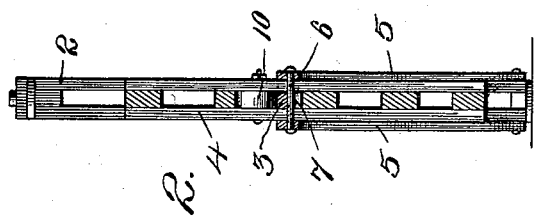
Witnesses
By his Attorneys,
Inventor
Andrew J. Russell

UNITED STATES PATENT OFFICE.

ANDREW J. RUSSELL, OF NORTH BALTIMORE, OHIO.

SLIDING AND SWINGING GATE.

SPECIFICATION forming part of Letters Patent No. 562,035, dated June 16, 1896.

Application filed December 13, 1895. Serial No. 572,056. (No model.)

*To all whom it may concern:*

Be it known that I, ANDREW J. RUSSELL, a citizen of the United States, residing at North Baltimore, in the county of Wood and State of Ohio, have invented a new and useful Improvement in Sliding and Swinging Gates, of which the following is a specification.

The invention relates to improvements in sliding and swinging gates.

The object of the present invention is to improve the construction of sliding and swinging gates and to provide a simple and inexpensive one capable of ready vertical adjustment to afford a passage beneath it for small animals and to enable it to clear snow and other obstructions.

The invention consists in the construction and novel combination and arrangement of parts, hereinafter fully described, illustrated in the accompanying drawings, and pointed out in the claims hereto appended.

Figure 1 is a side elevation of a sliding and swinging gate constructed in accordance with this invention. Fig. 2 is a transverse sectional view. Fig. 3 is a detail view of the hanger, illustrating the manner of adjusting the track-bar on which the gate slides.

Like numerals of reference indicate corresponding parts in all the figures of the drawings.

1 designates a hanger comprising a vertical pivot-post 2, journaled at its top and bottom, a horizontal track-bar 3, on which a gate 4 slides, and an inclined brace 5, pivoted at its lower end to the pivot-post 2, at the bottom thereof, and having its outer or upper end detachably and adjustably connected to the outer end of the horizontal track-bar 3. The pivot-post is provided at top and bottom with journals, and it is composed of parallel sides forming an intervening space for the reception of the gate, which may be constructed in any suitable manner, but which in the accompanying drawings is shown composed of horizontal rails and vertical bars.

The brace 5 is composed of parallel bars located at opposite sides of the gate and connected at their upper terminals by a transverse fastening device 6, which is adapted to engage any one of a series of notches 7 at the lower edge of the track-bar 3, constructed of any suitable material. By moving the upper end of the brace or prop 5 inward the track-bar is elevated, as illustrated in dotted lines in Fig. 3 of the accompanying drawings, and the gate may be raised to afford a passage for small animals and also to clear obstructions, such as snow and the like.

The inner end of the track-bar 3 is provided at its lower edge with a notch 8, adapted to engage a fastening device 9 of the upright 2, the fastening device 9 being designed to be arranged in any one of a vertical series of perforations 10 of the upright 2.

The gate is provided with a centrally-arranged roller 11, which may be provided with a flat or grooved tread and which is arranged to run on the track-bar, and the gate is opened in the usual manner by first sliding it along the track-bar of the hanger and then swinging it on the pivots of the latter.

It will be seen that the gate is simple and inexpensive in construction, that it is positive and reliable in operation, and that it is capable of being readily adjusted vertically to provide a passage for small animals and the like and to enable it to swing clear of obstructions.

Changes in the form, proportion, and minor details of construction may be resorted to without departing from the principle or sacrificing any of the advantages of this invention.

What I claim is—

1. The combination with a gate, of a hanger comprising a pivot-post, a horizontal track-bar receiving the gate and having its inner end detachably secured to the pivot-post and capable of vertical adjustment thereon to raise and lower the gate, and an inclined brace pivoted at its lower end to the post and adapted to swing inward and outward longitudinally of the horizontal track-bar and adapted to support the latter at different points along the same, substantially as and for the purpose described.

2. The combination with a gate provided with a roller, of a hanger comprising a vertical pivot-post provided with a vertically-adjustable fastening device, an inclined brace pivoted at its lower end to the pivot-post at the bottom thereof and provided at its upper end with a fastening device, and a horizontal track-bar receiving the roller of the gate and provided at its inner end with a notch to engage the fastening device of the pivot-post, and having at its outer end a series of notches for the reception of a fastening device of the
5 brace, substantially as and for the purpose described.

In testimony that I claim the foregoing as my own I have hereto affixed my signature in the presence of two witnesses.

ANDREW J. RUSSELL.

Witnesses:
 GEORGE W. WOLFE,
 GEO. W. EWING.